(12) United States Patent
Jonas et al.

(10) Patent No.: US 10,775,479 B2
(45) Date of Patent: Sep. 15, 2020

(54) EFFICIENT NON-INTERFERING MULTI-RADAR TRANSMISSION SCHEME

(71) Applicant: GM Global Technology Operations LLC, Detroit, MI (US)

(72) Inventors: Amnon Jonas, Jerusalem (IL); Oded Bialer, Petah Tivak (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 274 days.

(21) Appl. No.: 15/680,322

(22) Filed: Aug. 18, 2017

(65) Prior Publication Data
US 2019/0056477 A1    Feb. 21, 2019

(51) Int. Cl.
| G01S 7/292 | (2006.01) |
| G01S 13/931 | (2020.01) |
| G01S 7/02 | (2006.01) |
| G01S 13/34 | (2006.01) |

(52) U.S. Cl.
CPC ............ *G01S 7/2921* (2013.01); *G01S 7/023* (2013.01); *G01S 13/345* (2013.01); *G01S 13/931* (2013.01); *G01S 2013/93271* (2020.01)

(58) Field of Classification Search
CPC ...... G01S 7/2921; G01S 7/023; G01S 13/345; G01S 13/931
USPC ............................................ 342/70, 373, 443
See application file for complete search history.

(56) References Cited

U.S. PATENT DOCUMENTS

2017/0160381 A1\* 6/2017 Cho .......................... G01S 7/40

\* cited by examiner

*Primary Examiner* — Bo Fan
(74) *Attorney, Agent, or Firm* — Cantor Colburn LLP

(57) ABSTRACT

A vehicle, radar system of the vehicle and method of operating a radar system. The radar system includes a first sensor that generates a first chirp signal; a second sensor for generating a second chirp signal and which received reflected signals. One of the first sensor and second sensor receives a signal that includes a first reflected signal related to the first chirp signal and a second reflected signal related to the second chirp signal. A processor multiplies the received signal by one of the first chirp signal and the second chirp signal to obtain a desired signal indicative of one of the first reflected signal and the second reflected signal and an interference signal indicative of the other of the first reflected signal and the second reflected signal, and applies a filter to the mixed signal to separate the interference signal from the desired signal.

13 Claims, 9 Drawing Sheets

EFFICIENT NON-INTERFERING MULTI-RADAR TRANSMISSION SCHEME

INTRODUCTION

The subject disclosure relates to a method of operating a radar array on a vehicle and, in particular, a vehicular radar array and method of operation that reduces interference due to a plurality of reflected signals received at a receiver of the radar array.

Radar systems used in vehicles often include a plurality of sensors, often in transmitter-receiver pairs, arranged in an array on the vehicle. In basic operation, a sensor will transmits a test pulse into a volume or region surrounding the vehicle and receive a reflection of the test pulse from an object in the volume or region. Calculations of range, velocity, azimuth angle of the object can then be determined from the reflected signals. However, at least some of the sensors can share a same field-of-view and therefore can receive each other's reflected pulses. Interference occurs when a reflection received at one sensor is due to reflection of a test pulse generated by a different sensor. This type of interference increases with the number of sensors having a shared field-of-view.

Methods of reducing interference include time-division multiplexing, in which sensors take turns transmitting their respective test pulses so that the test pulses do not overlap in time, and frequency division multiplexing, in which each sensor transmits a test pulse having a different frequency. Time-division multiplexing suffers from inefficient power utilization at the transmitters as well as slower data acquisition rates. Frequency division multiplexing uses up the frequency bandwidth of the radar system at the expense of range resolution and can provide a poor estimation of an angle of arrival of an object.

Accordingly, it is desirable to provide a method and radar system that can remove or reduce the effects of interfering reflections without resorting to time-division multiplexing or frequency-division multiplexing.

SUMMARY

In one exemplary embodiment, a method of operating a radar system having an array of sensors is disclosed. The method includes receiving a signal at a sensor of the radar system that includes a first reflected signal and a second reflected signal, wherein the first reflected signal is formed by reflection from an object of a first chirp signal transmitted by the sensor, and the second reflected signal is related to a second transmitted chirp signal, mixing the first chirp signal with the received signal to obtain a desired signal indicative of the first reflected signal and an interference signal indicative of the second reflected chirp signal; and applying a filter to separate the desired signal from the interference signal.

In one embodiment, a time interval between a time at which the first chirp signal is generated and a time at which the second chirp signal is generated is less than a time duration of at least one of the first chirp signal and the second chirp signal. In another embodiment, the time interval between a time at which the first chirp signal is generated and a time at which the second chirp signal is a pseudo-randomly generated time interval greater than twice a maximal expected duration between transmission of a chirp signal from a sensor and reception at the sensor of a reflection related to the chirp signal. In another embodiment, a time delay between the first chirp signal and the first reflected signal is less than a time delay between the first chirp signal and the second reflected signal.

In various embodiments, the filter is a low pass filter. A cut-off frequency of the low pass filter is related to half the time duration of at least one of the first chirp signal. In one embodiment, the time interval between the first chirp signal and the second chirp signal is a pseudo-random time interval to reduce an ambiguity between Doppler effects and angle of arrival effects at the sensor.

In another exemplary embodiment, a radar system for a vehicle is disclosed. The radar system includes a first sensor for generating a first chirp signal, a second sensor for generating a second chirp signal, and a processor. The processor is configured to receive a signal at one of the first sensor and the second sensor, the received signal including a first reflected signal formed by reflection of the first chirp signal from an object and a second reflected signal formed by reflection of the second chirp signal from the object, multiply the received signal by one of the first chirp signal and the second chirp signal to obtain a desired signal indicative of one of the first reflected signal and the second reflected signal and an interference signal indicative of the other of the first reflected signal and the second reflected signal, and apply a filter to the mixed signal to separate the interference signal from the desired signal.

In one embodiment, a time interval between a time at which the first sensor generates the first chirp signal a time at which the second sensor generates the second chirp signal is less than a time duration of at least one of the first chirp signal and the second chirp signal. In another embodiment, the time interval between a time at which the first sensor generates the first chirp signal and a time at which the second sensors generates the second chirp signal is a pseudo-randomly generated time interval greater than twice a maximal expected duration between transmission of a chirp signal from a sensor and reception at the sensor of a reflection related to the chirp signal. In another embodiment, a time delay between the first chirp signal and the first reflected signal is less than a time delay between the first chirp signal and the second reflected signal.

In one embodiment, the filter is a low pass filter and a cut-off frequency of the low pass filter is related to half the time duration of at least one of the first chirp signal and the second chirp signal. In one embodiment, the time interval between the first chirp signal and the second chirp signal is a pseudo-random time interval to reduce an ambiguity between Doppler effects and angle of arrival effects at the sensor.

In yet another exemplary embodiment, a vehicle is disclosed. The vehicle includes a first sensor for generating a first chirp signal, a second sensor for generating a second chirp signal, and a processor. The processor is configured to receive a signal at one of the first sensor and the second sensor, the received signal including a first reflected signal formed by reflection of the first chirp signal from an object and a second reflected signal formed by reflection of the second chirp signal from the object, multiply the received signal by one of the first chirp signal and the second chirp signal to obtain a desired signal indicative of one of the first reflected signal and the second reflected signal and an interference signal indicative of the other of the first reflected signal and the second reflected signal, and apply a filter to the mixed signal to separate the interference signal from the desired signal.

In one embodiment, a time interval between a time at which the first sensor generates the first chirp signal a time at which the second sensor generates the second chirp signal is less than a time duration of at least one of the first chirp signal and the second chirp signal. In another embodiment, the time interval between a time at which the first sensor generates the first chirp signal and a time at which the second sensors generates the second chirp signal is a pseudo-randomly generated time interval greater than twice a maximal expected duration between transmission of a chirp signal from a sensor and reception at the sensor of a reflection related to the chirp signal. In another embodiment, a time delay between the first chirp signal and the first reflected signal is less than a time delay between the first chirp signal and the second reflected signal.

In one embodiment, the filter is a low pass filter. A cut-off frequency of the low pass filter is related to half the time duration of at least one of the first chirp signal and the second chirp signal. In one embodiment, the processor is changes a trajectory of the vehicle with respect to the object based on radar parameters determined from the desired signal.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
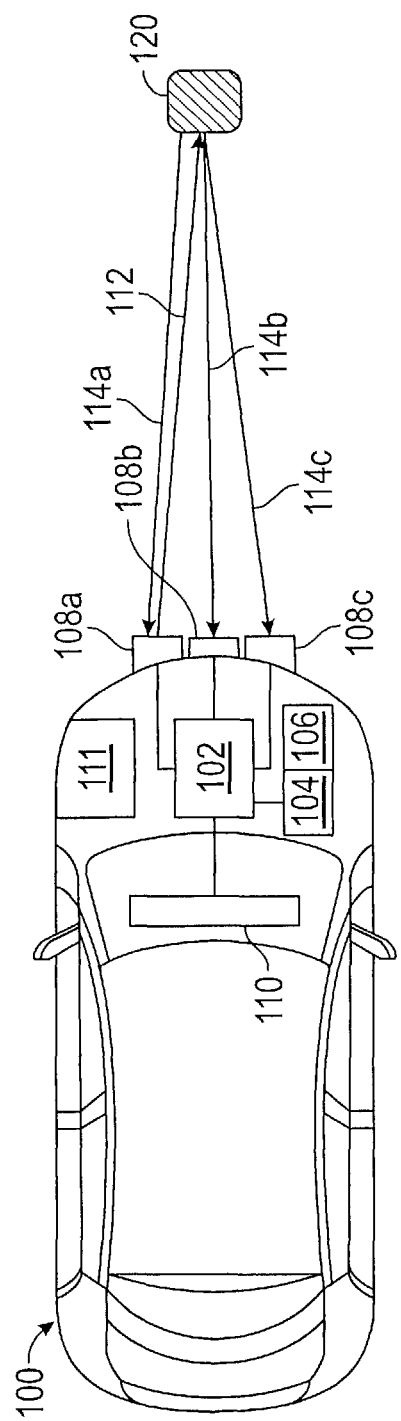
FIG. 1 illustrates a plan view of an exemplary vehicle configured for navigating an environment with respect to an object within its environment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 illustrates a plan view of an exemplary vehicle 100 configured for navigating an environment with respect to an object 120 within the environment. The vehicle 100 includes a radar system including an array of sensors 108a, 108b and 108c for obtaining information about one or more objects 120 in the environment. In one embodiment, the sensors 108a, 108b, 108c include transmitter-receiver pairs that transmit electromagnetic test pulses into the environment of the vehicle 100 (such as illustrative test pulse 112 transmitted from sensor 108a) and receives one or more reflections (such as reflections 114a, 114b and 114c) of the test pulse 112 from one or more objects 120 within the environment. The electromagnetic test pulses can be in a radio frequency range of frequencies. In other embodiments, the sensors 108a, 108b, 108c can be transducers capable of transmitting and receiving signals. Additionally, some of the sensors 108a, 108b, 108c can be transmitter-receiver pairs while others of the sensors 108a, 108b, 108c can be transducers.

The vehicle 100 includes a central processor 102 for performing the various methods of data acquisition, data processing and vehicle navigation disclosed herein. The central processor 102 controls operation of the array of sensors 108a, 108b and 108c to generate test pulses 112 by at least one of the sensors 108a, 108b, 108c and to receive and process reflections 114a, 114b, 114c from the one or more objects 120. The processor 102 performs various methods for determining radar parameters of the one or more objects 120, such as its range, relative velocity, angular location, etc.

For illustrative purposes, FIG. 1 shows only the transmission of a test pulse 112 from sensor 108a and the desired reflection 114a of that the test pulse 112, as well as the interfering reflections 114b and 114c received at nodes 108b, and 108c, respectively. It is to be understood that there is also a transmission signal from sensor 108b that hits 120 and is reflected back to sensors 108a, 108b, and 108c. It is also to be understood that there is a transmission signal from sensor 108c that is reflected back to sensors 108a, 108b and 108c.

The processor 102 is further in communication with various internal state sensors 110 of the vehicle 100. The internal state sensors 110 measure various parameters of the vehicle 100, including, but not limited to, a speed of the vehicle 100, a location of the vehicle, a braking parameter indicative of a state of the braking system of the vehicle 100, an acceleration parameter indicative of a propulsion state of the vehicle 100, a steering parameter of the vehicle 100, etc. The processor 102 is further in communication with various actuator devices 111 of the vehicle 100 and can provide a control signal to one or more of the actuator devices 111 in order to control the operation of the vehicle 100 in response to various calculations with respect to the environment and/or the object 120. The various actuator devices 111 include, but are not limited to, a steering actuation device for steering the vehicle 100 in response to a steering signal from the processor 102, an accelerator for providing acceleration to the vehicle 100 in response to an acceleration signal from the processor 102, a braking device for decelerating the vehicle 100 in response to a braking signal from the processor 102. In another embodiment, the processor 102 may provide information about the environment and/or object 120 to a display to alert a vehicle's driver to the object.

The processor 102 is in communication with a memory storage device 104 that includes various programs 106 that, when executed by the processor 102, enable the processor 102 to perform the various methods disclosed herein. In one aspect the programs 106 enable the processor 102 to identify and remove an interference signal from among a plurality of signals received at a sensor, leaving a desired signal. The programs 106 further enables the processor 102 to determine various parameters of an object 120 such as range, relative velocity, angular location, etc. with respect to the vehicle 100 from the desired signal. The processor 102 can determine from an internal state of the vehicle 100 (as measured by internal state sensors 110) and the determined radar parameters of the object 120, a predicted trajectory of the vehicle 100 with respect to the object 120 as well as a predicted outcome along the predicted trajectory, such as a probability of impact with the object 120. The processor can redirect the vehicle 100 based on the predicted outcome to change the trajectory, thereby obtaining a different outcome, such as avoiding the predicted impact. The processor 102 activates the various actuator devices 111 of the vehicle 100 to redirect the vehicle 100.

Figure 2:
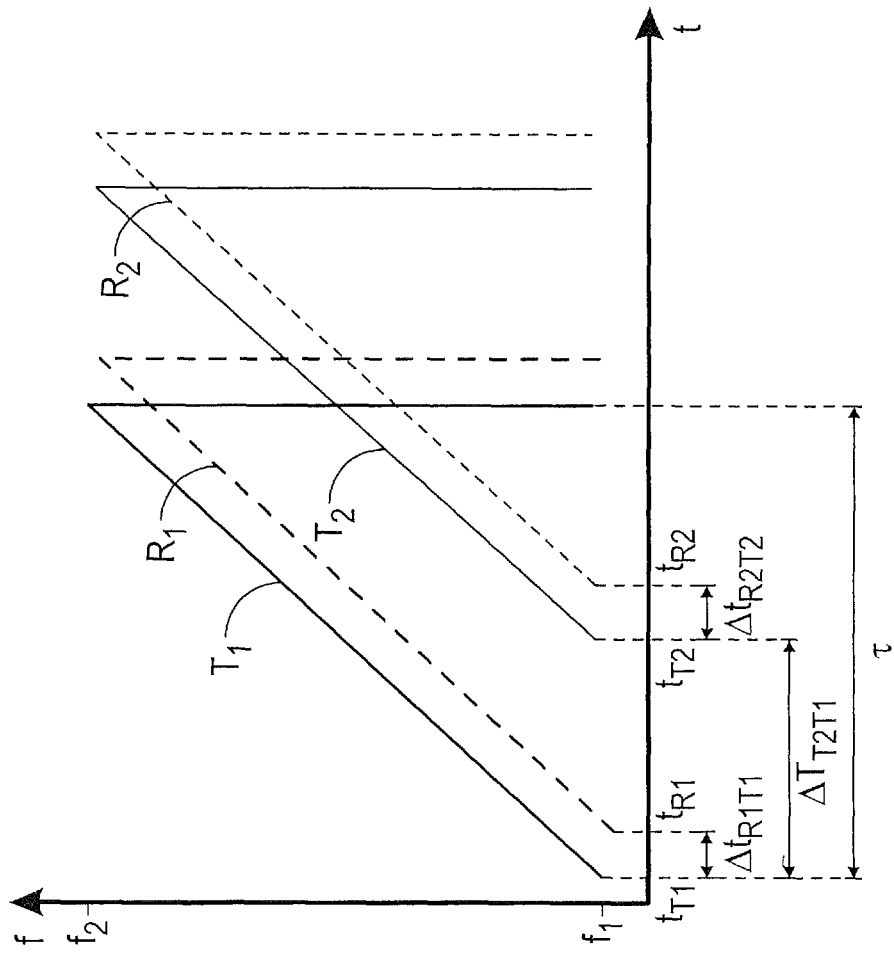
FIG. 2 shows a graph of illustrative transmitted and reflected signals from a radar system of the vehicle.

FIG. 2 shows a graph 200 of illustrative transmitted and reflected signals from a radar system of the vehicle 100. Time is shown along the abscissa and frequency is shown along the ordinate axis. The graph 200 includes a first transmitted signal T1 transmitted by a first sensor (e.g. sensor 108a) at a time $t_{T1}$ and a second transmitted signal T2 transmitted from a second sensor (e.g. sensor 108b) at a time $t_{T2}$. Time interval $\Delta T_{T2T1}$ is a time difference between the time $t_{T1}$ at which the first transmitted signal T1 is generated and the time $t_{T2}$ at which the second transmitted signal T2 is generated. Each of the first transmitted signal T1 and the second transmitted signal T2 are linear frequency modulated signals, also known as chirp signals. Each chirp signal has a specified time duration τ, starts at a first frequency $f_1$, increases its frequency linearly with time and ends at a second frequency $f_2$.

The chart 200 further shows a first reflected signal R1 and a second reflected signal R2. The first reflected signal R1 is related to the first transmitted signal T1 in that it is a reflection of the first transmitted signal T1 from an object. Similarly, the second reflected signal R2 is related to the second transmitted signal T2 in that it is a reflection of the first transmitted signal T2 from the object. The first reflected signal R1 is first received at time $t_{R1}$, i.e., the first frequencies of the first reflected signal R1 are received at a sensor at time $t_{R1}$. Similarly, the second reflected signal R2 is received at a time $t_{R2}$, i.e. the first frequencies of the second reflected signal R2 are received at a sensor at time $t_{R2}$. A time delay ($\Delta t_{R1T1} = t_{R1} - t_{T1}$) between generation of the first transmitted signal T1 and reception of the first reflected signal R1 is due to a round-trip travel time of the test pulse (T1) from the object 120. Similarly, a time delay ($\Delta t_{R2T2} = t_{R2} - t_{T2}$) between generation of the second transmitted signal T2 and reception of the second reflected signal R2 is due to a round-trip travel time of the signal T2 from the object 120.

The methods disclosed herein are used to discern the interference occurring at a sensor when, for example, the sensor transmits a test pulse and receives a reflected signal related to the test pulse and a second reflected signal unrelated to the test pulse. As shown in FIG. 2, signals T1, R1, T2 and R2 are discussed generally and not with respect to any particular sensor. However, when discussed with respect to FIG. 3, the received signals are considered to be received at a first sensor that generates a first test pulse (i.e., T1) before a second test pulse is generated, typically by another sensor. When discussed with respect to FIG. 4, the received signals are considered to be received at a second sensor that generates a test pulse (i.e., T2) after a first sensor generates its test pulse.

Figure 3:
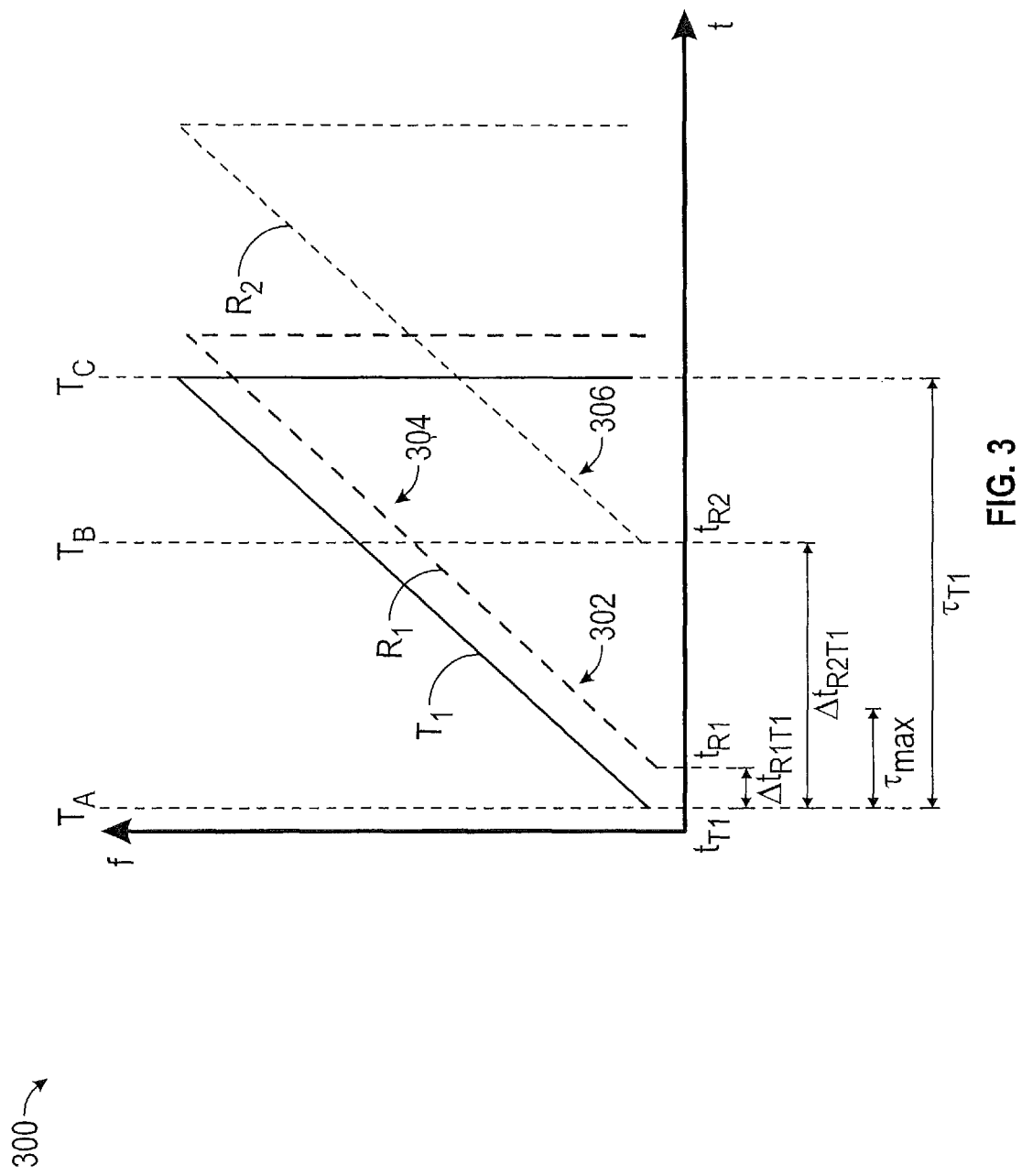
FIG. 3 illustrates a graph of various signals occurring at a sensor of the radar system in one embodiment.

FIG. 3 illustrates a graph 300 of various signals occurring at a sensor of the radar system in one embodiment. In this embodiment, a sensor records a first transmitted signal T1, a first reflected signal R1 related to the first transmitted signal T1 and a second reflected signal R2 that is unrelated to the first transmitted signal but is instead related to a transmitted signal that is generated some time after generation of the first transmitted signal T1, typically by another sensor. The first reflected signal R1 is a desired signal of FIG. 3 because it is related to the first transmitted signal T1. The second reflected signal R2 is an interference signal because it is unrelated to the first transmitted signal T1. A time delay $\Delta t_{R2T1}$ indicates a time duration between generation of the first transmitted signal T1 and receiving a second reflected signal R2 unrelated to the first transmitted signal. As can be seen in FIG. 3, the time delay $\Delta t_{R2T1}$ is clearly longer than the time delay $\Delta t_{R1T1}$.

The time duration $\tau_{T1}$ of the first transmitted signal T1 transmitted by the sensor extends from time $T_A (=t_{T1})$ to time $T_C$. The first reflected signal R1 is first received at the sensor at time $t_{R1}$. The second reflected signal R2 is first received at the sensor at time $T_B (=t_{R2})$. During the time period between $T_A$ and $T_B$, the total received signal includes only a portion 302 of the first reflected signal R1. However, during the time period between $T_B$ and $T_C$, the total reflected signal at the sensor includes portion 304 of the first reflected signal R1 and portion 306 of the second reflection signal R2. In order to separate the interference signal (R2) from the desired signal (R1) at sensor 108a, a waveform of the transmitted signal T1 is multiplied or mixed with a waveform of the total received signal.

Figure 5A:
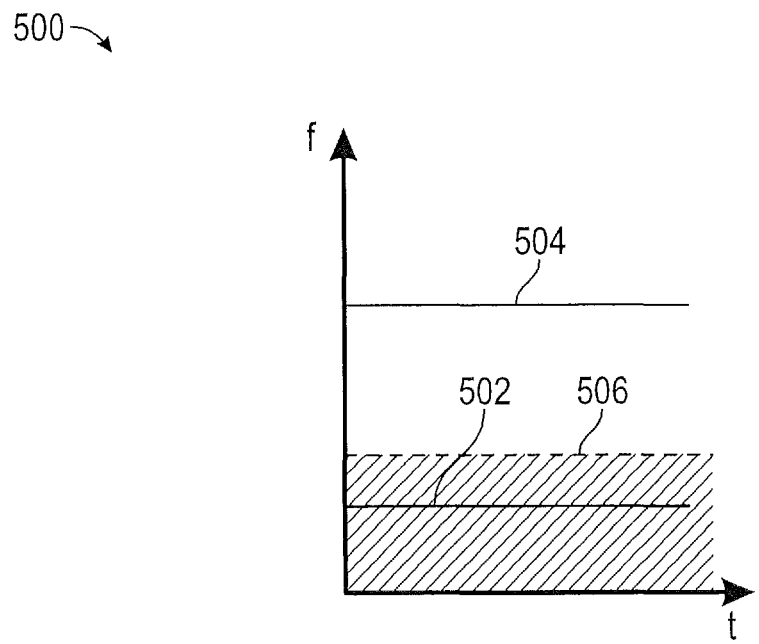
FIG. 5A shows plot of signal frequencies obtained upon mixing the waveform of a first transmitted signal with the waveform of the total received signal.

FIG. 5A shows plot 500 of signal frequencies obtained upon mixing the waveform of the transmitted signal T1 with the waveform of the total received signal. Time is shown along the abscissa and frequency is shown along the ordinate axis. In one embodiment, mixing two signals includes multiplication of the signals and/or summing/integrating signals. Mixing the waveforms produces a desired signal frequency 502 (related to signal R1) at a low frequency and an interference signal frequency 504 (related to signal R2) at a high frequency. The desired signal frequency 502 is related to the time delay $\Delta t_{R1T1}$ between transmitting signal T1 and receiving signal R1, and the interference signal frequency 504 is related to time delay $\Delta t_{R2T1}$ between transmitting signal T1 and receiving signal R2. Since $\Delta t_{R1T1}$ is less than $\Delta t_{R2T1}$, the desired signal frequency 502 is less than the interference signal frequency 504. Once the interference signal 504 and desired signal 502 are separated, a low pass frequency filter 506 can be applied over the selected time interval to remove the interference signal 504. The remaining desired signal 502 can then be used by the processor 108 to determine the various radar parameters of the object 120. In various embodiments, the cut-off frequency of the low pass filter can be selected as a frequency corresponding to a maximal expected duration, $\tau_{max}$, of the first transmitted signal T1. The parameter $\tau_{max}$ indicates a maximal expected round-trip delay between transmission of a signal from a transceiver and reception of a reflected signal related to the transmitted signal at the transceiver. This parameter that can be a predefined parameter of the transceiver or can be changed as found suitable. Referring back to FIG. 3, the time difference between generating signal T1 and generating signal T2 is selected so that the time difference $\Delta t_{R2T1}$ is selected to be greater than twice the maximal duration $\tau_{max}$ of the first transmitted signal T1 so that the interference signal 504 can be filtered out by the filter 506. It is to be understood that the mixing operation can also produce signals at higher frequencies than frequency 504 in FIG. 5A. The low-pass filter 506 rejects these additional higher frequency signals as well.

Figure 4:
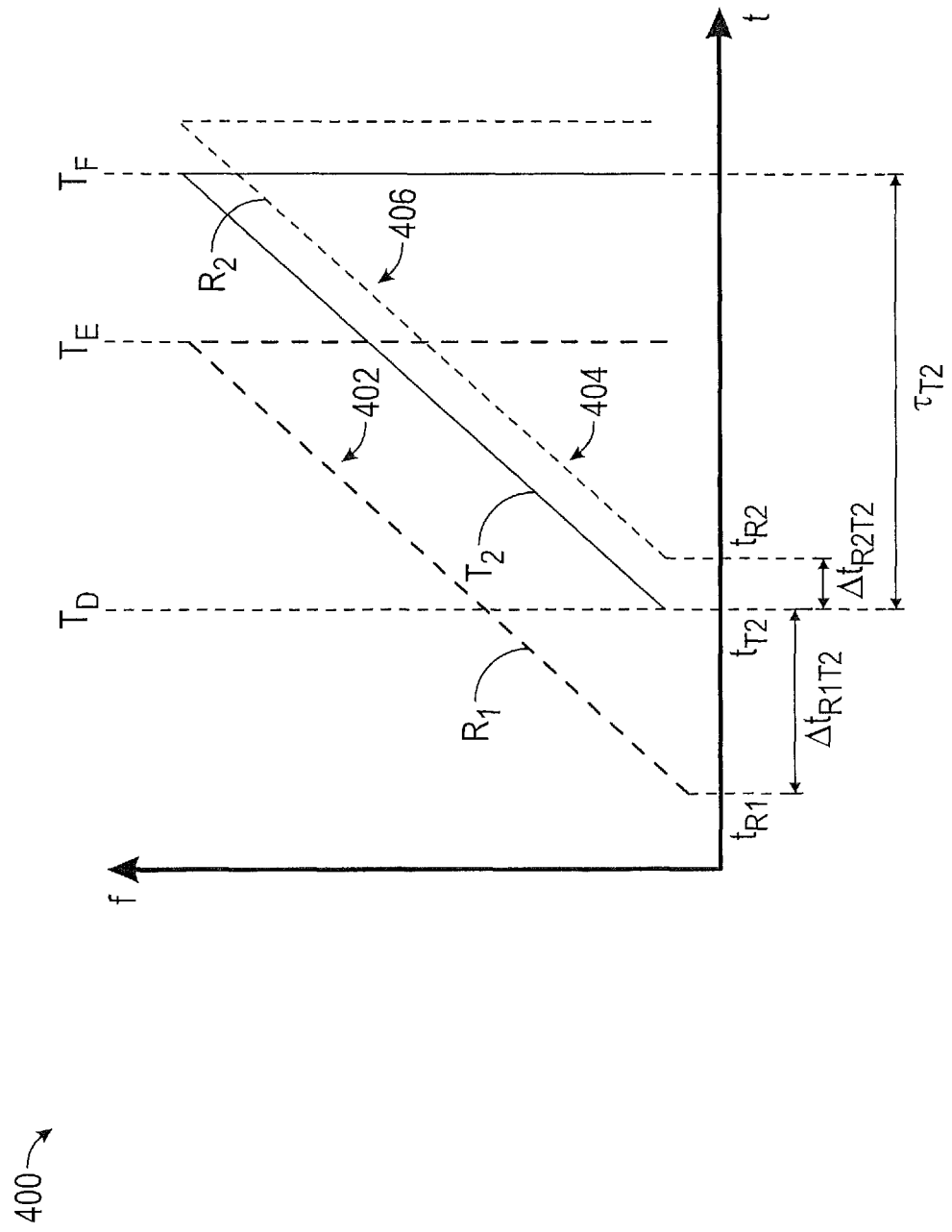
FIG. 4 illustrates a graph of various signals occurring at a sensor of the radar system in another embodiment.

FIG. 4 illustrates a graph 400 of various signals occurring at a sensor of the radar system in another embodiment. In this embodiment, a sensor generates and records a second transmitted signal T2 after a first transmitted signal, and receives a first reflected signal R1 related to the first transmitted signal and a second reflected signal R2 related to the second transmitted signal T2. In FIG. 4, the second reflected signal R2 is a desired signal because it is related to the second transmitted signal T2. The first reflected signal R1 is an interference signal because it is unrelated to second transmitted signal T2.

The time duration of the second transmitted signal T2 extends from time $T_D$ ($=t_{T2}$) to time $T_F$. The second reflected signal R2 is first received at the sensor at time $t_{R2}$. The first reflected signal R1 is first received at the sensors at time $t_{R1}$ before generation of the second transmitted signal T2 (as shown by $\Delta t_{R1T2}$). During the time period between $T_D$ and $T_E$, the total received signal substantially includes the portion 402 of the first reflected signal R1 and portion 404 of the second reflected signal R2. During the time period between $T_E$ and $T_F$, the total reflected signal includes only portion 406 of the second reflected signal R2.

In order to separate the interference signal (R1) from the desired signal (R2) at sensor 108a, a waveform of the second transmitted signal T2 is multiplied or mixed with a waveform of the total received signal.

Figure 5B:
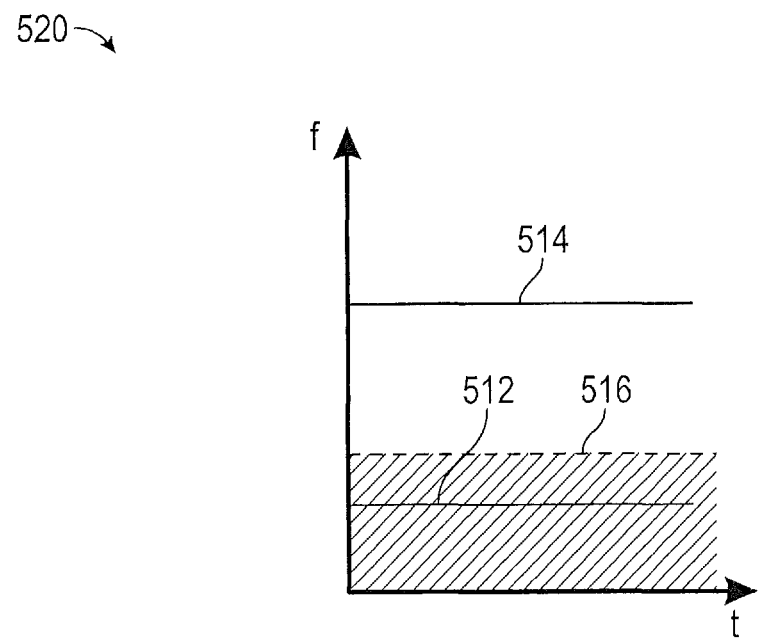
FIG. 5B shows frequency plot of signals obtained upon mixing the waveform of the second transmitted signal with the waveform of the total received signal.

FIG. 5B shows frequency plot 520 of signals obtained upon mixing the waveform of the second transmitted signal T2 with the waveform of the total received signal. Time is shown along the abscissa and frequency is shown along the ordinate axis. Mixing the waveforms separates the total received signal into a desired signal 512 frequency (related to signal R2) at a low frequency and an interference signal frequency 514 (related to signal R1) at a high frequency. Once the interference signal 514 and desired signal 512 are separated, a low pass frequency filter 516 is applied to the frequency space to remove the interference signal 514. The remaining desired signal 512 can then be used by the processor 102 to determine the various parameters of the object 120. In various embodiments, the cut-off frequency 516 of the low pass filter can be selected as a frequency indicative of the maximal duration, $\tau_{max}$, of the first transmitted signal T2. Referring back to FIG. 4, the time difference $\Delta t_{R1T2}$ is the time difference between two chirp transmission signals (e.g., T1 and T2) is selected to be larger than twice the expected maximal duration $\tau_{max}$. The time difference $\Delta t_{R1T2}$ is also selected to be greater than the time difference $\Delta t_{R2T2}$ so that the interference signal frequency 514 has the greater frequency and can subsequently be filtered out by the low pass filter 516. It is to be understood that the mixing operation can also produce signals at higher frequencies than frequency 514 in FIG. 5B. The low-pass filter 516 rejects these additional higher frequency signals as well.

Switching between sensors over time can cause a coupling between angle of arrival estimates and Doppler estimates. For example, a measured phase offset at a receiver can be a result of a difference in a spatial position (where the phase offset is a function of the angle of arrival and the antenna position difference) of a receiver antennas but can also be due to the motion of the object (Doppler frequency) with respect to the vehicle 100.

Figure 6:
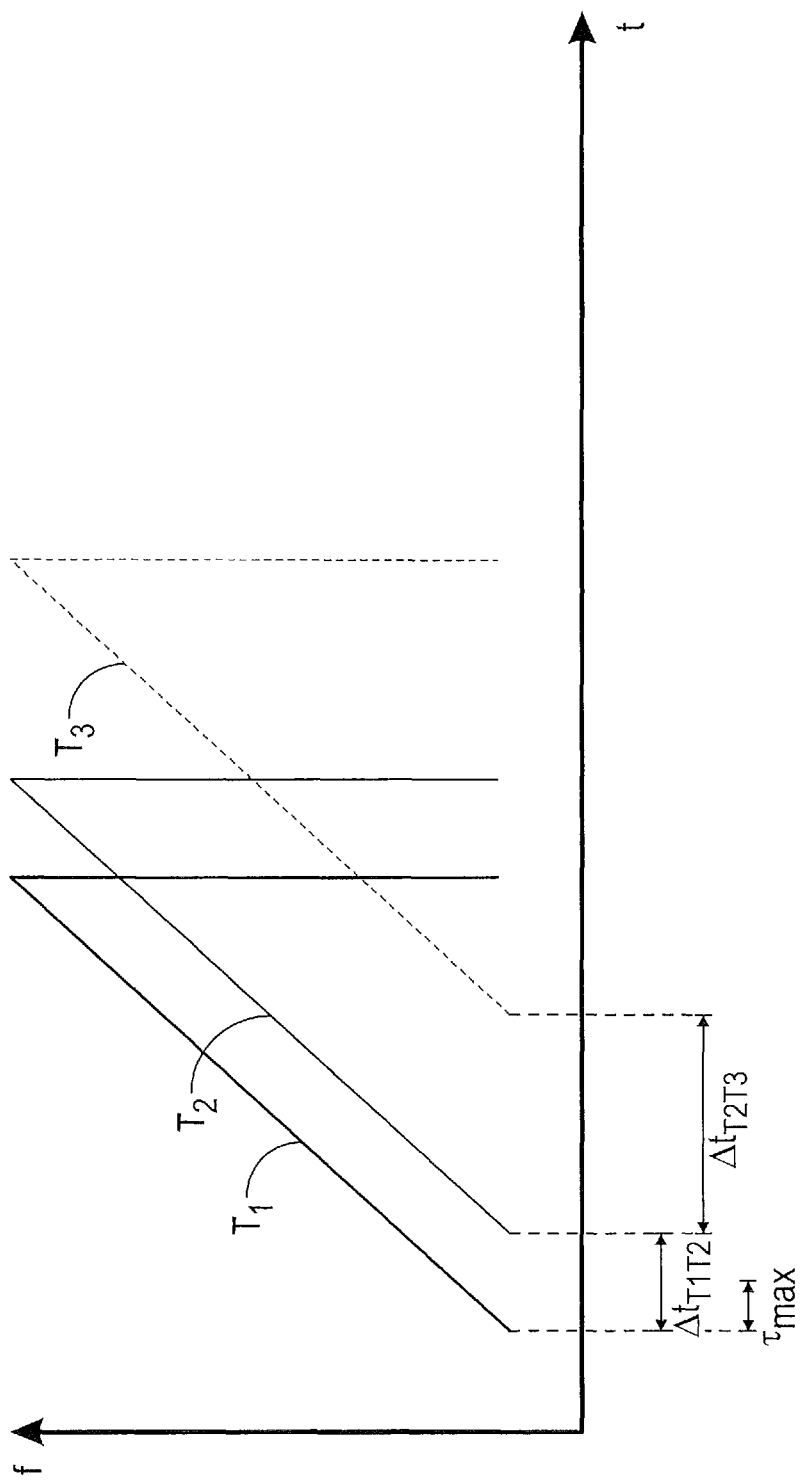
FIG. 6 illustrates a method of randomly generating transmission signals in order to separate Doppler effects from spatial resolution effects.

FIG. 6 illustrates a method of randomly generating transmission signal timing in order to separate Doppler effects from spatial resolution effects. FIG. 6 shows a plurality of transmission signals in succession with pseudo-random time intervals between them. The time interval $\Delta t_{T1T2}$ between the first transmission signal T1 and the second transmission signal T2 is unrelated to the time interval $\Delta t_{T2T3}$ between the second transmission signal T2 and the third transmission signal T3. The time intervals between transmission signals is determined by a random number generator which selected a pseudo-random time interval. The pseudo-random time interval is selected so that adjacent transmission signals overlap, generally not more than twice the maximal duration, $\tau_{max}$.

When there is a constant time interval between transmission signals, the phase difference between reflected signals is $$\phi_{n+1} - \phi_n = \theta_{Doppler} + \theta_{Spatial} \qquad \text{Eq. (}^1\text{)}$$

By varying the time interval in a pseudo-random manner while switching between two transmit antennas, the phase difference in each switch is given by $$\phi_{n+1} - \phi_n = \theta''_{Doppler} + \theta_{Spatial} \qquad \text{Eq. (2)}$$

where $\theta''_{Doppler}$ is a constantly changing quantity and $\theta_{Spatial}$ is a non-changing quantity. Therefore, the processor 102 can separate Doppler effects from location effects using the pseudorandom spacing between transmission signals.

Figure 7:
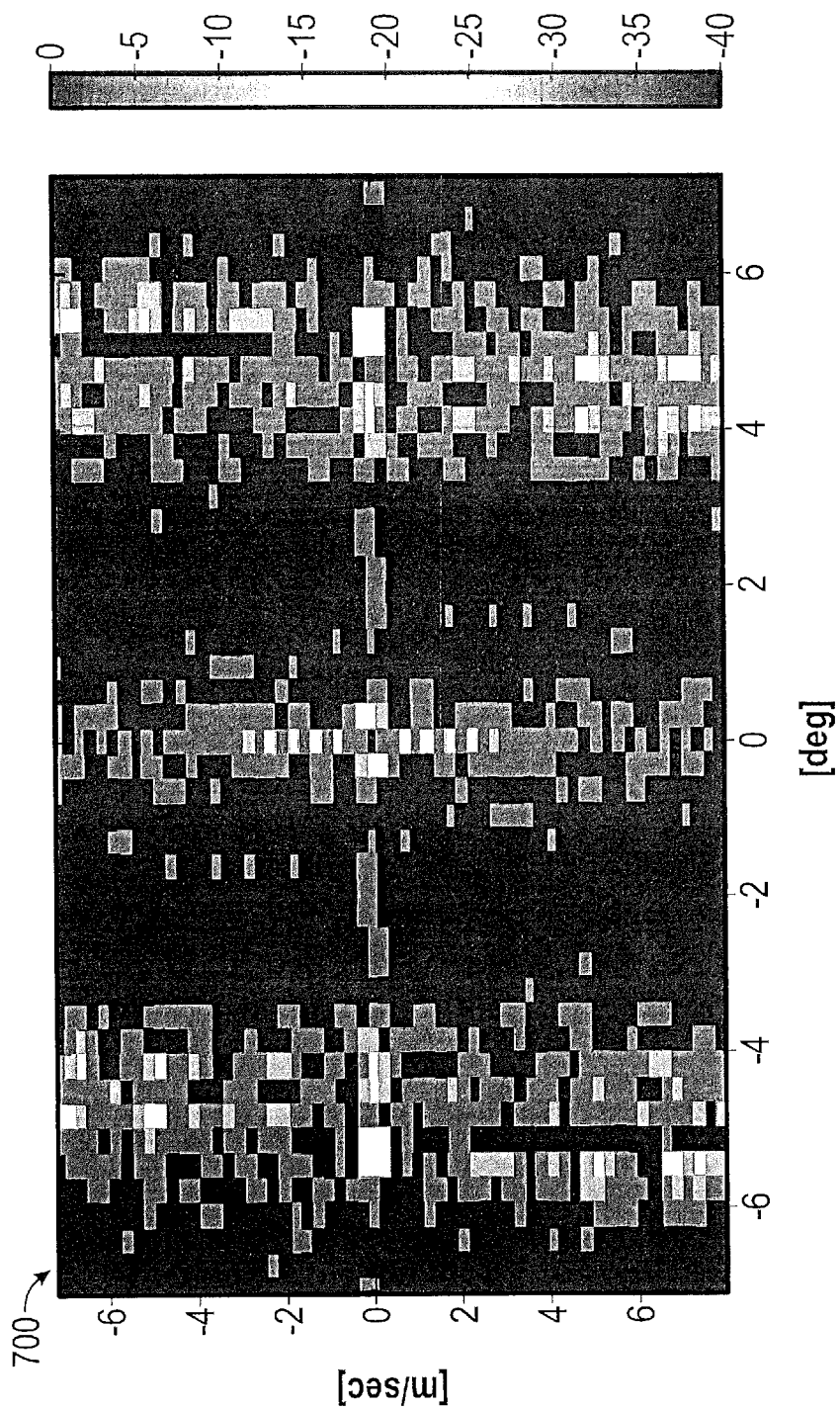
FIG. 7 shows an ambiguity plot of a velocity and angle of arrival parameters obtained using transmission signals separated using the pseudo-random time intervals of FIG. 6.
Figure 8:
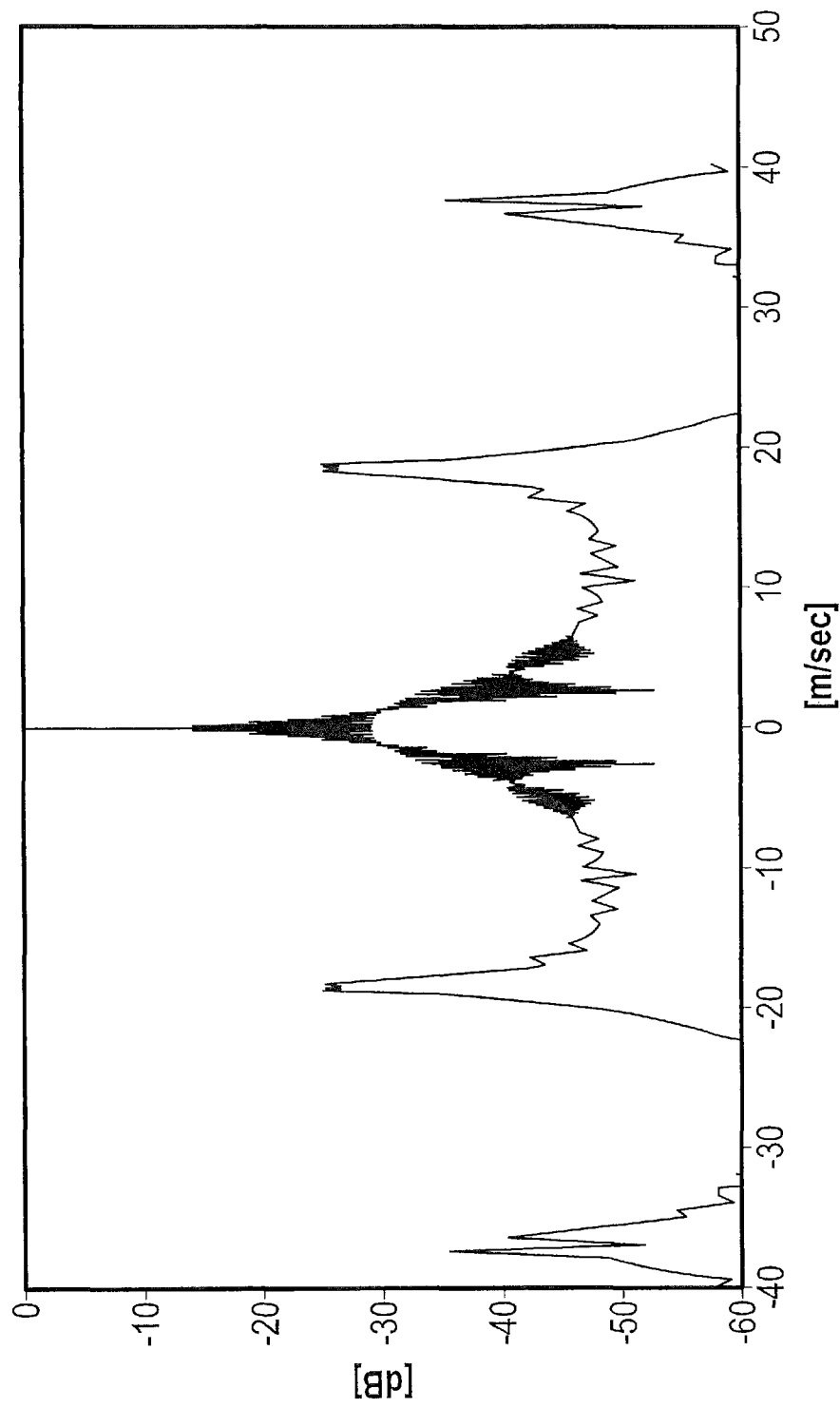
FIG. 8 shows a cross-section of the two dimensional-ambiguity plot of FIG. 7 at zero azimuth angle.
Figure 9:
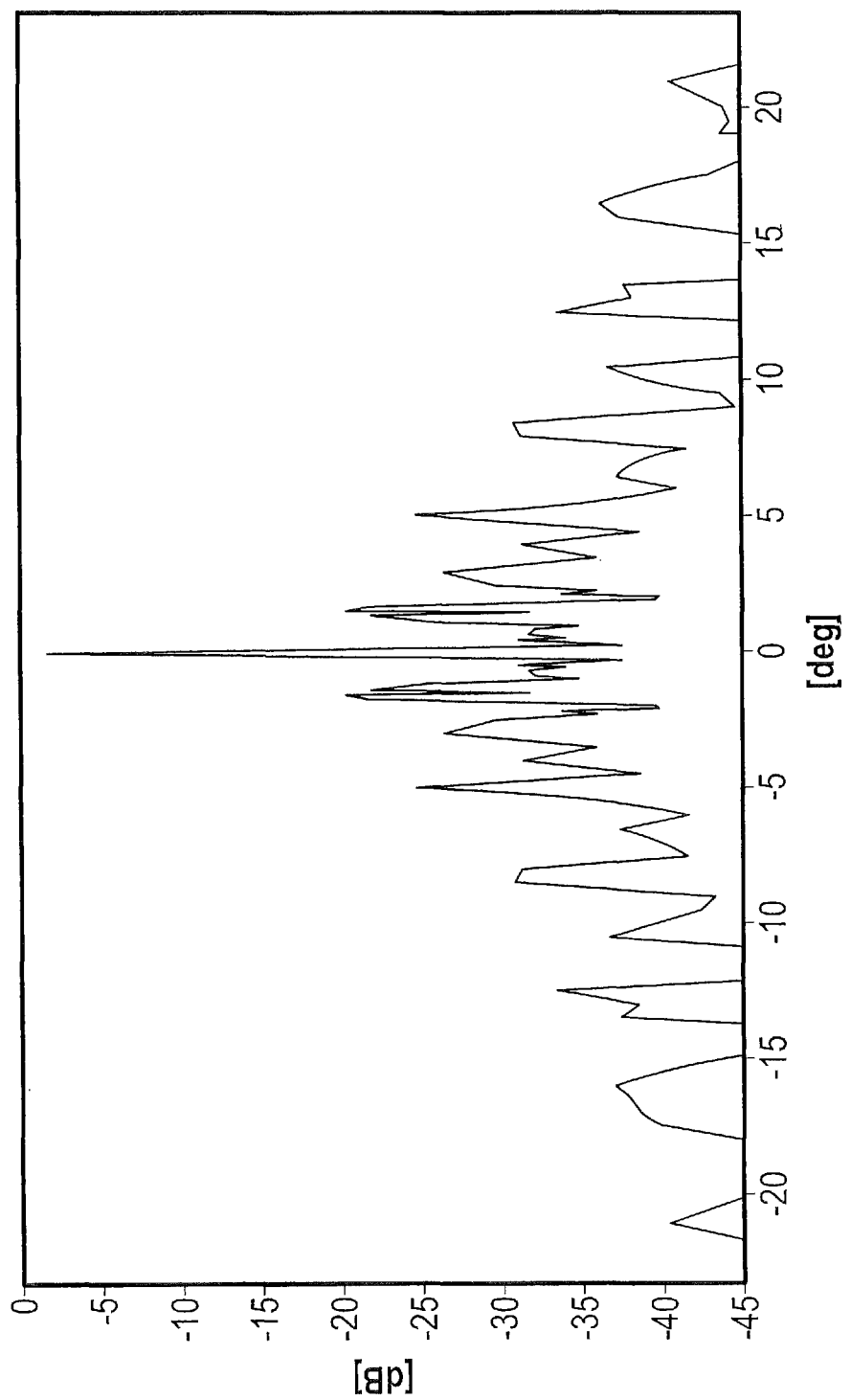
FIG. 9 shows a cross-section of the two dimensional-ambiguity plot of FIG. 7 at zero velocity.

FIG. 7 shows an ambiguity plot 700 of a velocity (Doppler) and angle of arrival parameters obtained using transmission signals separated using the pseudo-random time intervals of FIG. 6. The ambiguity plot 700 shows azimuth angle along the abscissa and velocity along the ordinate axis. A high amplitude peak occurs at zero velocity and zero azimuth angle plot. FIG. 8 shows a cross-section of the two dimensional-ambiguity plot 700 of FIG. 7 at zero azimuth angle. FIG. 8 demonstrate a discernible maximum peak centered at zero velocity that can be discerned from other peak candidates, notably at −20 meters/second and +20 meters/second, using the methods disclosed herein. FIG. 9 shows a cross-section of the two dimensional-ambiguity plot 700 of FIG. 7 at zero velocity. FIG. 9 shows a maximum peak centered at zero degree angle of arrival that can be discerned from other nearby peak candidates using the methods disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A radar system for a vehicle, comprising:
   a first sensor at a first location of the vehicle for generating a first chirp signal having a frequency range;
   a second sensor at a second location of the vehicle for generating a second chirp signal having the frequency range; and
   a processor configured to:
      receive a signal at one of the first sensor and the second sensor, the received signal including a first reflected signal formed by reflection of the first chirp signal from an object and a second reflected signal formed by reflection of the second chirp signal from the object,
      multiply the received signal by one of the first chirp signal and the second chirp signal to obtain a mixed signal including a desired signal indicative of one of the first reflected signal and the second reflected signal and an interference signal indicative of the other of the first reflected signal and the second reflected signal, and apply a filter to the mixed signal to separate the interference signal from the desired signal.

2. The radar system of claim 1, wherein a time interval between a time at which the first sensor generates the first chirp signal a time at which the second sensor generates the second chirp signal is less than a time duration of at least one of the first chirp signal and the second chirp signal.

3. The radar system of claim 2, wherein the time interval between a time at which the first sensor generates the first chirp signal and a time at which the second sensors generates the second chirp signal is a pseudo-randomly generated time interval greater than twice a maximal expected duration between transmission of a chirp signal from a sensor and reception at the sensor of a reflection related to the chirp signal.

4. The radar system of claim 1, wherein a time delay between the first chirp signal and the first reflected signal is less than a time delay between the first chirp signal and the second reflected signal.

5. The radar system of claim 1, wherein the filter is a low pass filter and a cut-off frequency of the low pass filter is related to half the time duration of at least one of the first chirp signal and the second chirp signal.

6. The radar system of claim 1, wherein the time interval between the first chirp signal and the second chirp signal is a pseudo-random time interval to reduce an ambiguity between Doppler effects and angle of arrival effects at the sensor.

7. A vehicle, comprising:

a first sensor at a first location of the vehicle for generating a first chirp signal having a frequency range;

a second sensor at a second location of the vehicle for generating a second chirp signal having the frequency range; and a processor configured to:

receive a signal at one of the first sensor and the second sensor, the received signal including a first reflected signal formed by reflection of the first chirp signal from an object and a second reflected signal formed by reflection of the second chirp signal from the object, multiply the received signal by one of the first chirp signal and the second chirp signal to obtain a mixed signal including a desired signal indicative of one of the first reflected signal and the second reflected signal and an interference signal indicative of the other of the first reflected signal and the second reflected signal, and apply a filter to the mixed signal to separate the interference signal from the desired signal.

8. The vehicle of claim 7, wherein a time interval between a time at which the first sensor generates the first chirp signal a time at which the second sensor generates the second chirp signal is less than a time duration of at least one of the first chirp signal and the second chirp signal.

9. The vehicle of claim 8, wherein the time interval between a time at which the first sensor generates the first chirp signal and a time at which the second sensors generates the second chirp signal is a pseudo-randomly generated time interval greater than twice a maximal expected duration between transmission of a chirp signal from a sensor and reception at the sensor of a reflection related to the chirp signal.

10. The vehicle of claim 7, wherein a time delay between the first chirp signal and the first reflected signal is less than a time delay between the first chirp signal and the second reflected signal.

11. The vehicle of claim 7, wherein the filter is a low pass filter.

12. The vehicle of claim 11, wherein a cut-off frequency of the low pass filter is related to half the time duration of at least one of the first chirp signal and the second chirp signal.

13. The vehicle of claim 7, wherein the processor is further configured to change a trajectory of the vehicle with respect to the object based on radar parameters determined from the desired signal.

* * * * *